(12) United States Patent
Gillet et al.

(10) Patent No.: US 8,056,806 B2
(45) Date of Patent: Nov. 15, 2011

(54) MACHINE-READABLE SYMBOL READER AND METHOD EMPLOYING AN ULTRACOMPACT LIGHT CONCENTRATOR WITH ADAPTIVE FIELD OF VIEW

(75) Inventors: Alain Gillet, Labege Cedex (FR); Jean-Louis Massieu, Montauban (FR)

(73) Assignee: Intermec IP Corp., Everett, WA (US)

( * ) Notice: Subject to any disclaimer, the term of this patent is extended or adjusted under 35 U.S.C. 154(b) by 666 days.

(21) Appl. No.: 12/088,344

(22) PCT Filed: Sep. 27, 2006

(86) PCT No.: PCT/US2006/038153
§ 371 (c)(1),
(2), (4) Date: Sep. 8, 2008

(87) PCT Pub. No.: WO2007/041349
PCT Pub. Date: Apr. 12, 2007

(65) Prior Publication Data
US 2009/0014525 A1    Jan. 15, 2009

Related U.S. Application Data

(60) Provisional application No. 60/722,466, filed on Sep. 30, 2005.

(51) Int. Cl.
*G06K 7/14* (2006.01)
(52) U.S. Cl. .................................. 235/454; 235/462.25
(58) Field of Classification Search .................. 235/454, 235/462.01, 462.14, 462.25, 462.42, 462.45, 235/472.01
See application file for complete search history.

(56) References Cited

U.S. PATENT DOCUMENTS

| | | | |
|---|---|---|---|
| 5,357,101 A | 10/1994 | Plesko | |
| 5,635,700 A | 6/1997 | Fazekas | |
| 6,547,139 B1 | 4/2003 | Havens et al. | |
| 6,715,683 B2 | 4/2004 | Aizawa et al. | |
| 6,969,003 B2 | 11/2005 | Havens et al. | |
| 7,227,202 B2* | 6/2007 | Kishishita | 257/207 |
| 7,292,493 B1* | 11/2007 | Ashizawa | 365/225.7 |
| 7,673,802 B2* | 3/2010 | Knowles et al. | 235/462.42 |
| 2005/0274806 A1* | 12/2005 | Dant | 235/462.21 |

* cited by examiner

*Primary Examiner* — Daniel St.Cyr
(74) *Attorney, Agent, or Firm* — Seed IP Law Group PLLC

(57) ABSTRACT

An optoelectronic reader for reading machine-readable symbol such as barcode symbols employs a detection subsystem having an RX concentrator. The detection subsystem may include an N-tuple RX concentrator. The RX concentrator may define an optical path for light to illuminate the machine-readable symbol.

18 Claims, 7 Drawing Sheets

MACHINE-READABLE SYMBOL READER AND METHOD EMPLOYING AN ULTRACOMPACT LIGHT CONCENTRATOR WITH ADAPTIVE FIELD OF VIEW

CROSS-REFERENCE TO RELATED APPLICATION

This application is a U.S. national stage application filed under 35 U.S.C. §371 of International Patent Application PCT/US2006/038153, accorded an international filing date of Sep. 27, 2006, which claims the benefit under 35 U.S.C. §119(e) of U.S. Provisional Patent Application No. 60/722,466, filed Sep. 30, 2005.

BACKGROUND OF THE INVENTION

1. Field of the Invention

This disclosure generally relates to automatic data collection (ADC) devices, for example, machine-readable symbol readers such as barcode scanners.

2. Description of the Related Art

Readers for reading machine-readable symbols are generally categorized into two groups: 1) moving beam devices commonly referred to as scanners (e.g., laser scanners), and 2) fixed beam devices commonly referred to as imagers (e.g., CCD imagers). Each group has its own relative advantages.

Moving beam devices typically move or scan a light across a target. For example, a scanner may employ a laser diode and a mechanism for moving a laser beam produced by the laser diode across the target. While it may be possible to move the light source itself, scanners typically employ one or more rotating prisms or oscillating mirrors that reflect the laser beam, sweeping the laser beam back and forth across a target, and thereby sequentially illuminating portions of the target along a scan line. Scanners also typically include an optoelectronic sensor or light detector, for example one or more photodiodes. The optoelectronic sensor detects the laser light returned (e.g., reflected) from the target, and produces a corresponding analog signal. The scanner may employ a standard lens or retro-collector to focus the returned light on the optoelectronic sensor. Typically, the scanner, or an associated device, converts an analog signal produced by the optoelectronic sensor into to a digital signal, before decoding the digital signal according to standard decoding schemes.

While fixed beam devices may rely on ambient light, most imagers employ a flood illumination subsystem. The flood illumination subsystem typically includes a number of high intensity light emitting diodes (LEDs) arranged to simultaneously flood the entire target with light. Imagers strive for uniform illumination over the entire target. Imagers also include an optoelectronic sensor, e.g., one- or two-dimensional arrays of charge coupled devices (CODs), and may include a lens assembly to focus returned light onto the optoelectronic sensor. A CCD array may be electronically sampled or scanned, to produce a digital signal suitable for decoding.

Typically, scanners include non-imaging optics that do not rely upon the quality of the image, but instead focus on the transfer efficiency (i.e., the ratio of the energy directed to the detector over the energy entering the collector). For example, U.S. Pat. No. 5,357,101 describes a barcode scanner using a non-imaging compound parabolic collector. While a compound parabolic collector is efficient at rejecting unwanted light, there is no simple way to change the field of view. Furthermore, an ideal compound parabolic collectors, or line flow concentrators, is very long. Thus, compound parabolic collectors are often truncated or used with a first imaging stage at the expense of transfer efficiency and cost. The use of compound parabolic collectors in Micro-Electronic-Mechanical Systems (MEMS) devices is severely limited by their relatively large size.

There is a need for a small light collector that can be used with very small illumination subsystems, such as MEMS based illumination subsystems. There is also need for a light collector with the ability to reject unwanted light. Hence there is a need in automatic data collection arts for an optoelectronic reader that can overcome at least some of the aforementioned drawbacks.

BRIEF SUMMARY

In one aspect, an optoelectronic reader for reading machine-readable symbols comprises an illumination subsystem configured to illuminate a machine-readable symbol, a first light detector and an RX concentrator. The RX concentrator comprises a first shaped optical medium having a top surface defining an aperture for receiving light from the machine-readable symbol and a reflective bottom surface, the reflective bottom surface configured to focus light reflected from the reflective bottom surface at the first light detector, wherein the first light detector is disposed within the shaped optical medium.

In another aspect, a method of using an optoelectronic reader for reading machine-readable symbols comprises receiving light returned from machine-readable symbols, the returned light incident upon an illumination area of a surface of a detector; analyzing the receive light; changing the illumination area from a first size to a second size; and reading the machine-readable symbols using light incident upon the illumination area having the second size.

In yet another aspect, device comprises an optical medium extending between an upper surface and a reflective bottom surface, the upper surface defining at least one light transmissive aperture, the reflective bottom surface defining a plurality of light focusing regions, wherein each of the light focusing regions focuses light incident thereon towards a focal point located between the light focusing region and the upper surface.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well known structures associated with optoelectronic readers such as barcode readers and methods for reading machine-readable symbols such as barcode symbols, area or matrix code symbols and/or stacked code symbols have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
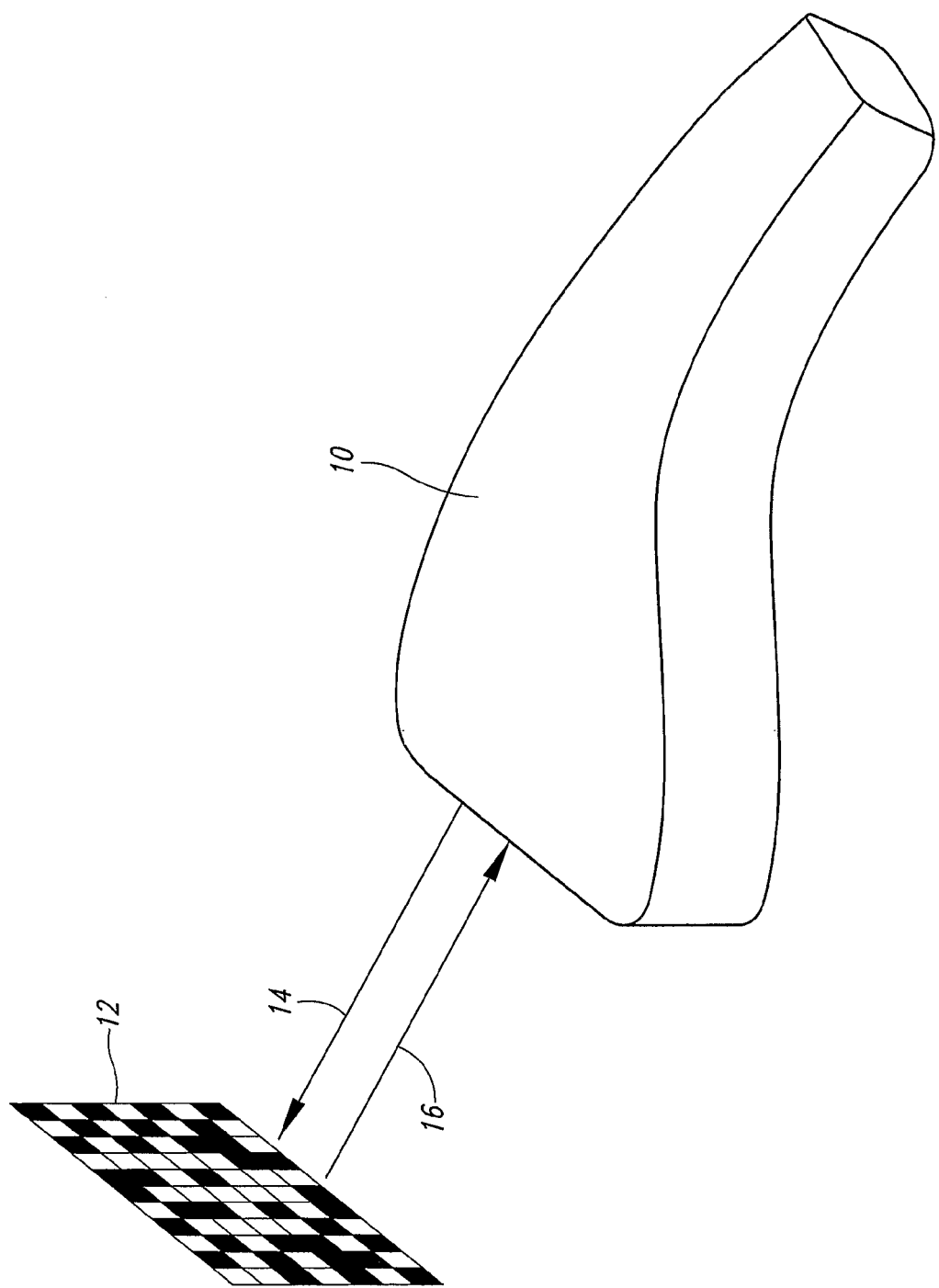
FIG. 1 is an isometric view of an optoelectronic reader reading a machine-readable symbol according to one illustrated embodiment.

FIG. 1 shows an optoelectronic reader 10 positioned to read machine-readable symbol 12. A machine-readable symbol 12 includes, but is not limited to, a barcode symbol, an area or matrix code symbol, or a stacked code symbol. Light 16 is returned (e.g., reflected) from the machine-readable symbol 12 and received by the optoelectronic reader 10. In some embodiments, the optoelectronic reader 10 may rely on ambient light as the source of the returned light 16. In other embodiments, the optoelectronic reader 10 may actively illuminate the machine-readable symbol 12 with light 14. As used herein and in the claims, light includes electromagnetic radiation in the visible, infrared, and ultra-violet portions of the electromagnetic spectrum.

Figure 2:
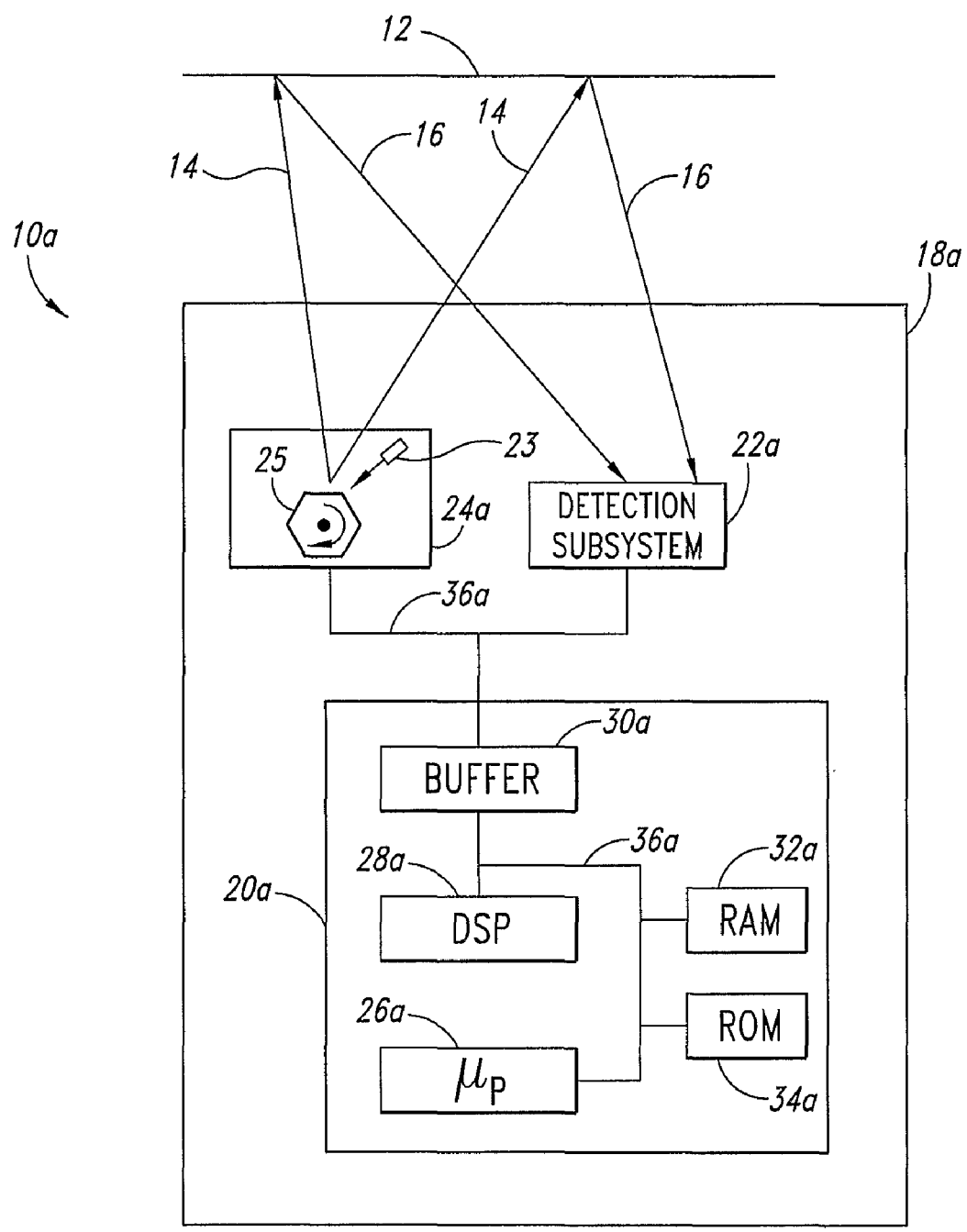
FIG. 2 is a functional block diagram of an optoelectronic reader reading a machine-readable symbol according to one illustrated embodiment.

FIG. 2 shows the optoelectronic reader 10 reading the machine-readable symbol 12 according to one illustrated embodiment. The optoelectronic reader 10 may include a housing 18a, control subsystem 20a, detection subsystem 22a, and optionally illumination subsystem 24a.

The control subsystem 20a may include one or more controllers such as microprocessor 26a, digital signal processor (DSP) 28a, application-specific integrated circuit (ASIC) and/or field programmable gate array (FPGA). The control subsystem 20a may include one or more memories, for example a buffer 30a, random access memory (RAM) 32a, and/or read-only memory (ROM) 34a coupled to the controllers via one or more buses 36a. While illustrated as having a single bus 36a, the optoelectronic reader 10 may include more than one bus. For example, separate buses may be provided for power, control and data. Where the optoelectronic reader 10 takes a handheld form, power may be supplied from a battery, ultra-capacitor, fuel cell, or other portable power source.

Among other things, the control subsystem 20a includes logic for controlling the operation of the detection subsystem 22a and the illumination subsystem 24a. The control subsystem 20a also includes logic for processing signals from the detection subsystem 22a for reading the machine-readable symbol 12.

The detection subsystem 22a receives the light 16, which includes light returned from the machine-readable symbol 12, and generates a signal (e.g., analog or digital) indicative of the received light 16. The detection subsystem 22a provides the control subsystem 20a with the signal via bus 36a.

The illumination subsystem 24a emits light 14 in response to a triggering command from the control subsystem 20a. The illumination subsystem 24a receives the triggering command via the bus 36a. In some embodiments, the illumination subsystem 22a may be configured emit light 14 as a beam. In addition, the control subsystem 20a can control, among other things, the direction of the beam from the illumination subsystem 22a and the rate of scan of the beam. The illumination subsystem 22a may, for example, include a light source such as laser diode 23, and a movable reflector such as a multi-faceted prism 25 mounted to rotate about an axis to scan the beam of light 14 across a target, such as the machine-readable symbol 12.

Figure 3:
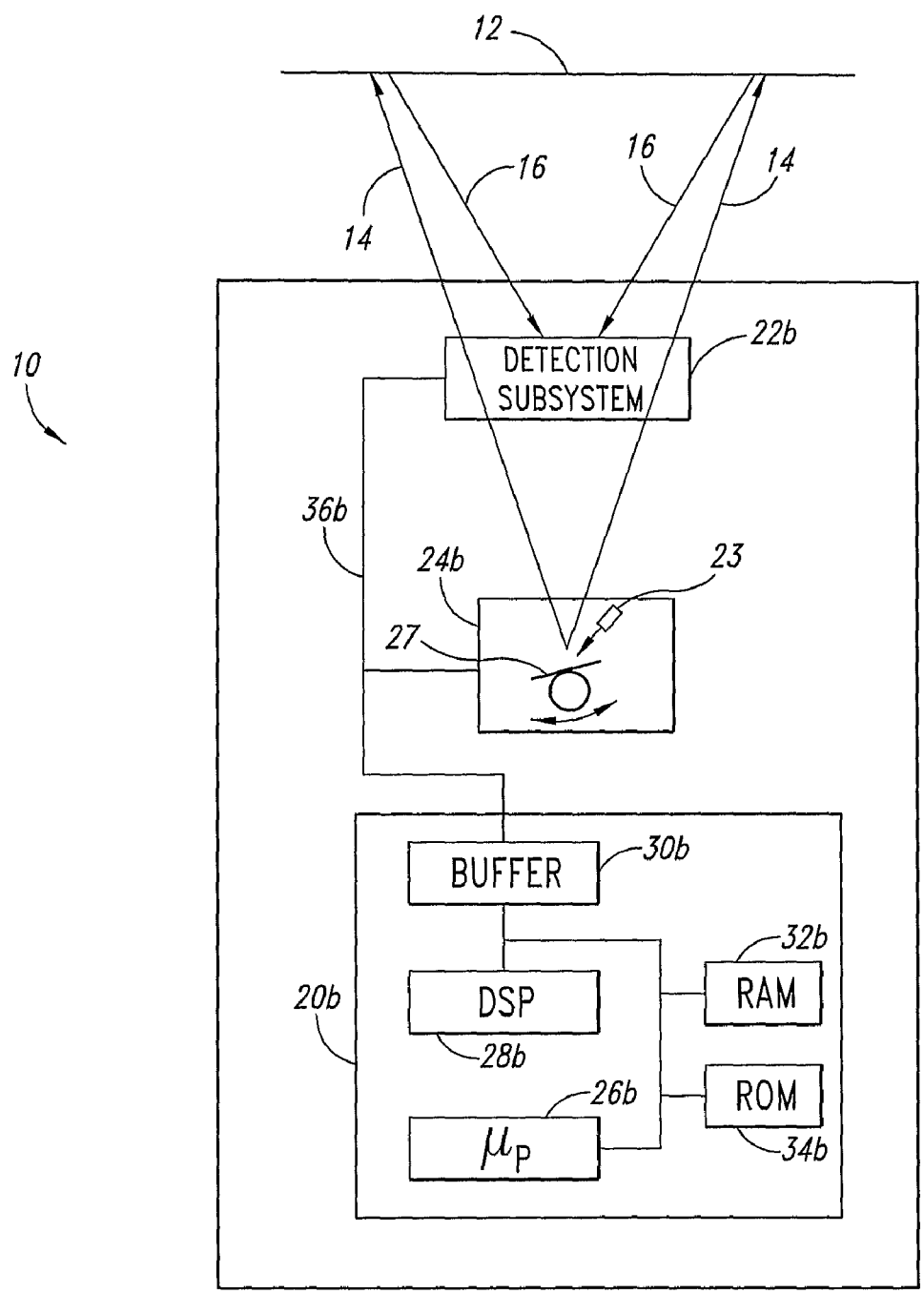
FIG. 3 is a functional block diagram of an optoelectronic reader reading a machine-readable symbol according to a second illustrated embodiment.

FIG. 3 shows another embodiment of the optoelectronic reader 10 reading the machine-readable symbol 12 according to a second illustrated embodiment. In FIG. 3, the various labels having a "b" identify similar components as those of FIG. 2 that are labeled with an "a." The detailed description of such components are initially provided with respect to the embodiment of FIG. 2 and for the sake of brevity the description of such components in the context of their subsequently b-labeled counterparts in FIG. 3 are abbreviated or omitted.

The detection subsystem 22b receives the light 16 returned from of the machine-readable symbol 12 and provides the controller subsystem 20b with a signal indicative of the received light 16. In addition, the detection subsystem 22b is configured to have the light 14 from the illumination subsystem 24b pass therethrough.

The illumination subsystem 24b may include a light source, such as a laser diode 23, and a moveable reflector such as a mirror 27 mounted to oscillate about an axis to scan the beam of light 14 across a target, such as the machine-readable symbol 12.

Figure 4:
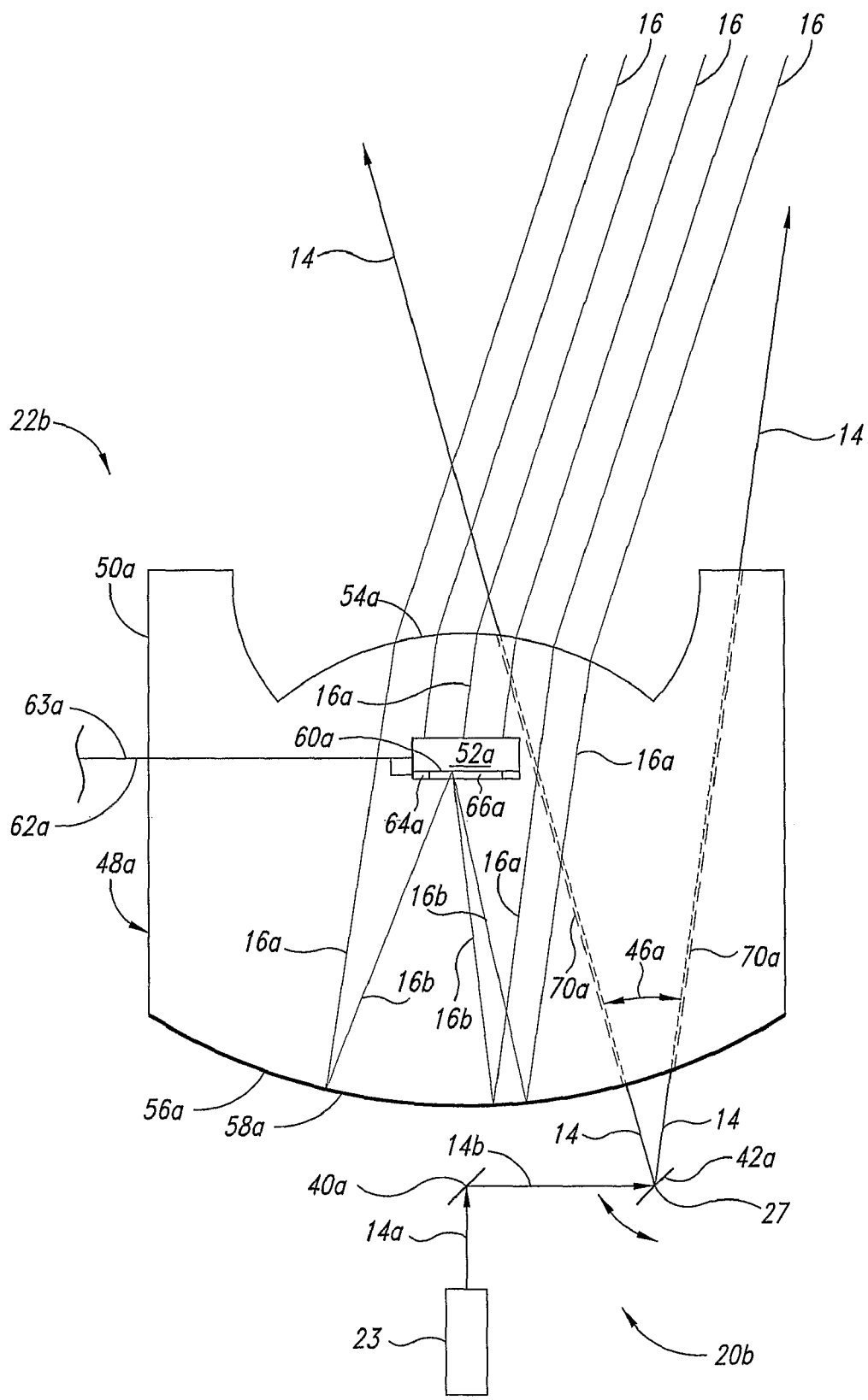
FIG. 4 is a functional block diagram of one detection subsystem and an illumination subsystem of the optoelectronic reader of FIG. 3 according to one illustrated embodiment.

FIG. 4 shows components of a combined detection subsystem 22b and illumination subsystem 24b. The illumination subsystem 24b includes a light source 23, a stationary mirror 40, and an oscillating mirror 27.

The light source 23 is described herein as the laser diode 23. However, such discussion is provided only for the sake of clarity and is not intended to be limiting. In other embodiments, light sources include non-lasing light sources such as, but not limited to, light-emitting diodes (LEDs).

The laser diode 23 emits a laser beam 14a that is incident on the stationary mirror 40. The stationary mirror 40 is aligned to reflect the incident light 14a as reflected light 14b to the oscillating mirror 27.

The oscillating mirror 27 defines a rotational axis 44a about which the oscillating mirror 27 rotates. The amount of angular rotation about the rotational axis 44a and the rate of rotation of the oscillating mirror 27 may be controlled by the control subsystem 20b. The light 14b is incident upon the oscillating mirror 27 and is reflected therefrom as light 14. As the oscillating mirror 27 pivots, reflected light 14 is scanned over the machine-readable symbol 12. The amount of angular rotation of the oscillating mirror 27 defines the scan angle 46a of the light 14. Some embodiments may employ the rotating multi-faceted prism 25 (FIG. 2) instead of the oscillating mirror.

In some embodiments, the oscillating mirror 27 has a second axis of rotation. The second axis of rotation may be perpendicular to the rotational axis 44a. Together, the rotational 44a and the second axis of rotation allow the control subsystem 20b the degrees of freedom necessary for scanning the light 14 over the machine-readable symbol 12 in two dimensions. A suitable structure is disclosed in U.S. Pat. No. 6,879,428.

The detection subsystem 22b includes an RX concentrator 48a and a light detector 52a. The RX concentrator 48a includes a shaped optical medium 50a. The light detector 52a is disposed within the optical medium 50a. The optical medium 50a defines an upper surface 54a, which is referred to hereinafter as concentrator aperture 54a, and a bottom surface 56a.

The concentrator aperture 54a is light transmissive. The concentrator aperture 54a receives incoming light 16, which includes light that has been returned from the machine-readable symbol 12. The incoming light 16 is refracted by the optical medium 50a as light 16a. The refracted light 16a is directed towards the bottom surface 56a.

The bottom surface 56a includes a reflective surface 58a, which reflects light 16a as light 16b. The bottom surface 56a and the reflective surface 58a are shaped to focus light 16b upon the light detector 52a. In some embodiments, the bottom surface 56a is parabolic, and in other embodiments the bottom surface 56a is defined by an n-degree polynomial having coefficients that are minimize the Point Spread Function (PSF) of edge rays. The coefficients can be determined using ray tracing techniques.

The light detector 52a may be one or more photodiodes, one-dimensional or two-dimensional arrays of CCDs or CMOS devices. The light detector 52a has an active surface 60a, which faces the bottom surface 56a and which includes multiple pixels. The active surface 60a of the light detector 52a receives the light 16b. Based upon the received light 16b, the light detector 52a provides the control subsystem 20b with a signal 62a via an electrical connector 63a that is in electrical communication with the bus 36b. In one embodiment, the light detector 52a is positioned in the shaped optical medium 50a such that the light detector 52a overlaps the focal point (not shown) of the reflective surface 58a. Furthermore, in one embodiment, the light detector 52a is positioned in the shaped optical medium 50a such that the active surface 60a includes the focal point of the reflective surface 58a.

In the embodiment illustrated in FIG. 4, the RX concentrator 48a includes an optical stop 64a abutting the active surface 60a. In other embodiments, the optical stop 64a might be proximal to, but not abutting, the active surface 60a. The optical stop 64a defines an aperture 66a (hereinafter referred to as optical stop aperture). The size of the optical stop aperture 66a defines the "effective" size of the active surface 60a. When the optical stop 64a abuts the active surface 60a, the effective size of the active surface 60a corresponds to the size of the optical stop aperture 66a.

In the embodiment illustrated in FIG. 4, the optical stop 64a is a dynamic optical stop controlled by the control subsystem 20b. The control subsystem 20b may dynamically change the size of the optical stop aperture 64a, thereby changing the effective size of the active surface 60a. In some embodiments, the optical stop 64a may be comprised of one or more liquid crystal (LC) arrays. Typically, the optical stop 64a is comprised of two LC matrices. Each one of the LC matrices acts as a polarizing filter, and the LC matrices are aligned such that their polarization axes are perpendicular. The control subsystem 20b, which is in electrical communication with the optical stop 64a via the bus 36b and an electrical connector, can actuate any given pixel in the LC matrices by applying a voltage to the given pixel. The control subsystem 20b can turn individual pixels on and off thereby allowing or preventing light 16b from reaching the active surface 60a.

In some embodiments, the optical stop 64a may be static. Whether the optical stop 64a is static or dynamic, the optical stop aperture 66a defines a field-of-view of the RX concentrator 48a. In the case of a dynamic optical stop 64a, the RX concentrator 48a can be used in situations of either near field scanning or far field scanning. For near field scanning, the effective size of the active surface 60a is larger than the effective size of the active surface 60a during far field scanning, and similarly, the scanning angle 46a is greater in near field scanning than it is in far field scanning. The control subsystem 20b also controls the oscillating mirror 27 such that the light 14 scans (and or rasters) the entire length (and width) of the machine-readable symbol 12 and controls the dynamic optical stop 64a such that the field of view of the effective active surface 60a receives light that is returned from the edges of the machine-readable symbol 12.

It should be noted that RX concentrators having different fields-of-view could be manufactured by using different static optical stops. This allows a manufacturer to produce different RX concentrators without having to determine a new shape for the shaped optical medium 50a and without having to use a different sized optical detector.

In the embodiment illustrated in FIG. 4, the RX concentrator 48a includes an optical band pass filter. The optical medium 48a may be comprised of an optical material such as Zeonex, polymethyl methacrylate (PMMA), polycarbonate, glass, etc. and a dye 68 that absorbs low frequency light. In that case, the optical medium 48a acts as a high pass filter. The reflective surface 58a may be a dielectric that acts as a low pass filter.

In the embodiment illustrated in FIG. 4, the RX concentrator 48a defines an optical pathway 70a through which the light 14 propagates. In this embodiment, the optical pathway 70a is an opening extending from the bottom surface 56a to the detector aperture 52a. In some embodiments, the reflective surface 58a may be suitable for allowing the light 14 to pass therethrough. In that case, the optical pathway 70a may be through the optical medium 50a.

Figure 5:
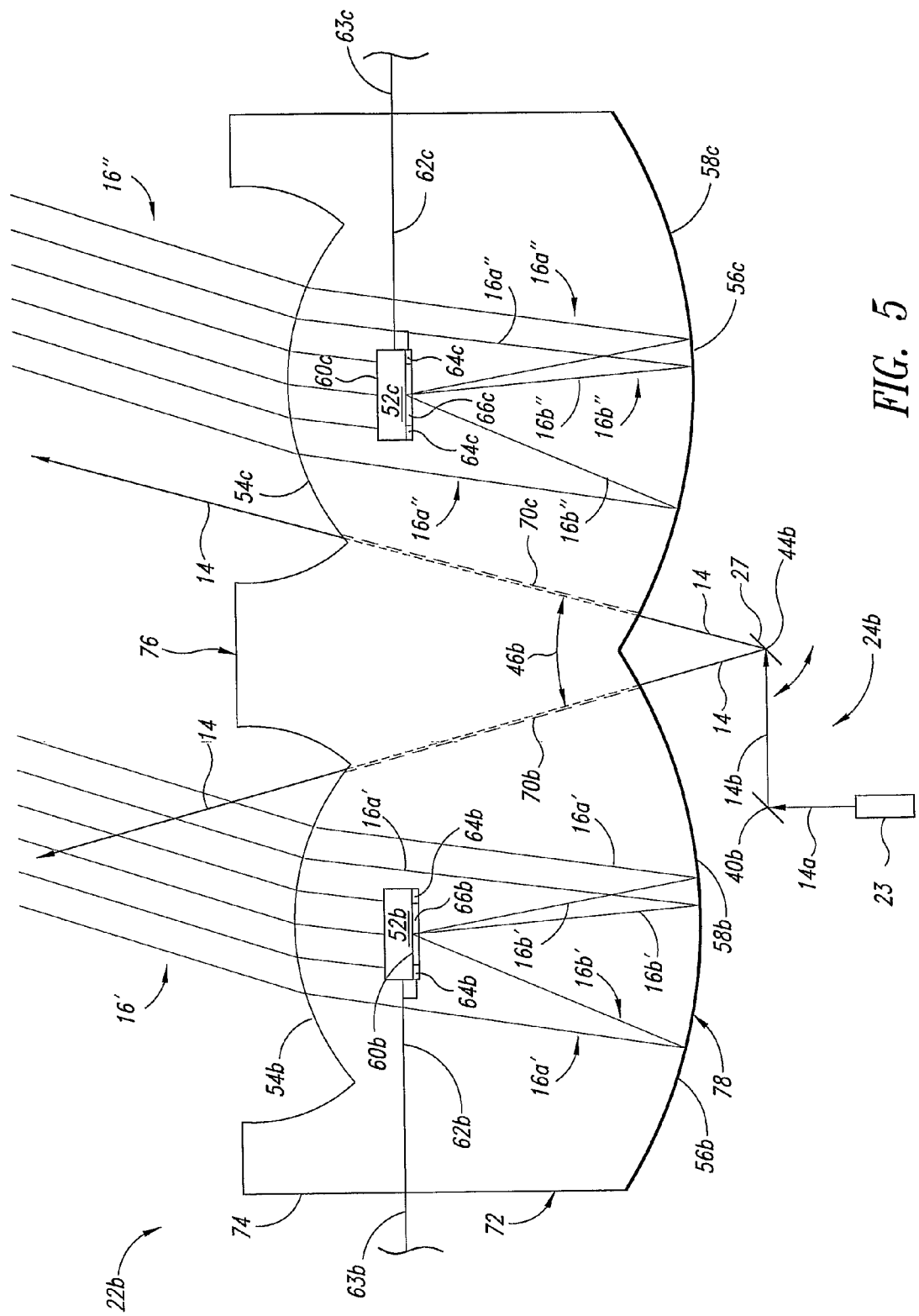
FIG. 5 is a functional block diagram of a second detection subsystem and an illumination subsystem of the optoelectronic reader of FIG. 3 according to a second illustrated embodiment.

FIG. 5 illustrates another embodiment of a combined detection subsystem 22b and illumination subsystem 24b. In FIG. 5, the various labels having a "b" or a "c" identify similar components as those of FIG. 4 that are labeled with an "a." The detailed description of such components are initially provided with respect to the embodiment of FIG. 4 and for the sake of brevity the description of such components in the context of their subsequently b-labeled or c-labeled counterparts in FIG. 5 are abbreviated or omitted.

In the embodiment illustrated in FIG. 5, the detection subsystem 22b includes a twin RX concentrator 72. Conceptually, the twin RX concentrator 72 may be considered as having two RX concentrators, each of which may be similar to the RX concentrator 48a shown in FIG. 4. While, in some embodiments, the twin RX concentrator 72 could be two single RX concentrators 48a that abut each other, the illustrated twin RX concentrator 70 is a single object. The twin RX concentrator 72 comprises a twin shaped contiguous optical medium 74. The embodiment includes two light detectors 52b and 52c. Each individual light detector 52b and 52c are similar to the light detector 52a of the embodiment illustrated in FIG. 4, and therefore, for the sake of brevity, the details of the light detectors 52b and 52c are not discussed.

The twin shaped optical medium 74 defines an upper surface 76, which is hereinafter referred to as twin concentrator aperture 76, and a bottom surface 78. The twin concentrator aperture 76 is shaped as two adjoining or contiguous concentrator apertures 54b and 54c. Similarly, the bottom surface 78 includes a first bottom surface portion 56b and a second bottom surface portion 56c. The first and second bottom surface portions 56b and 56c are each shaped similar to the bottom surface 56a. Each bottom surface portion 56b and 56c also includes a reflective surface 58b and 58c, respectively. The bottom surface portion 56a receives light 16a', which is reflected therefrom as light 16b'. The light 16b' is focused upon the light detector 52b. Similarly, the bottom surface portion 56b receives light 16a'', which is reflected therefrom as light 16b'' and which is focused on the light detector 52c. In the embodiment illustrated, each one of the light detectors 52b and 52c include an optical stop 64b and 64c, respectively. One or both of the optical stops 64b and 64c are optional in some embodiments.

It should be noted that RX concentrators generally have a low aspect ratio, thickness to aperture size, where the thickness is measured from the top surface (i.e., the aperture, of the RX concentrator to the bottom surface). Using the present twin RX concentrator design, the thickness of the twin RX concentrator 72 can be the same thickness as the single RX concentrator 48a while the effective aperture size is increased. Thus, the twin RX concentrator 72 can be used in situations where it is desirable to have a large aperture and a small thickness. It should be noted that the twin RX concentrator is merely one embodiment. Other embodiments include N-tuple RX concentrators, where N is a number equal to or greater than 2, and where an N-tuple RX concentrator defines a bottom surface having N reflective/focusing portions, where each of the N reflective/focusing portions are configured to have a focal point.

Figure 6:
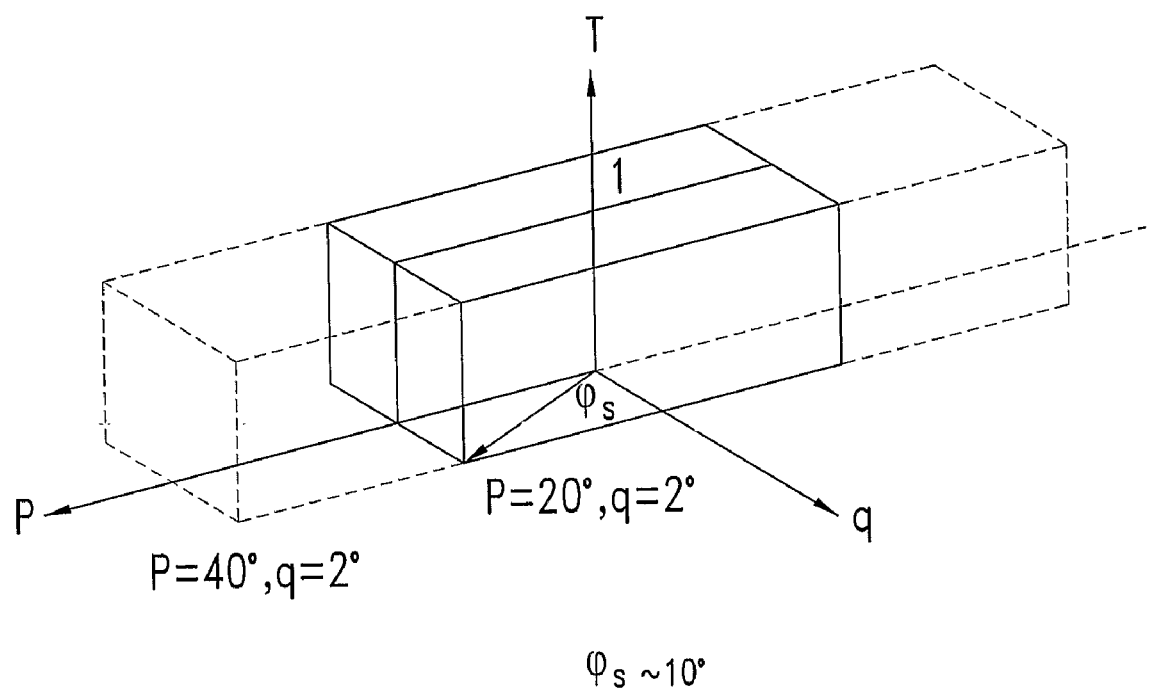
FIG. 6 is a graph illustrating calculated angular transmission characteristics for the detection subsystem of FIG. 5 according to one illustrated embodiment.

FIG. 6 shows a calculation of the transmission of an embodiment of a twin RX concentrator. The transmission is 100% for any incoming rays with incidence less than the angle of acceptance and zero elsewhere. The angle of acceptance is fixed as to subtend any point of the scanning field. To ensure that any rays reflected from the bottom surface will be received by the detector, the edge ray principle theorem is applied.

Edge ray principle states that is enough to connect any edge rays impinging on the collector at plus or minus $\theta_s$ to guarantee that any bundles of rays impinging the collector within plus or minus $\theta_s$ will be coupled. In other words, the maximum gain can be achieved only if the transmission $T(\theta)=1$ when $\theta \leq \theta_s$ and $T(\theta)=0$ when $\theta_s > \theta_s$. This means that $T(\theta)$ must have a sharp cut off when $\theta=\theta_s$. This equivalent optimizes the PSF at the edge of the field.

In some embodiments, a twin RX concentrator has both high acceptance selectivity and a high gain coupling. The transmission being constant and maximum in the field of scan. Reducing the size of the light detector to adapt to the field-of-view degrades the spatial selectivity and gain. However, if the size is reduced near the range scanning conditions, then some loss of efficiency can be afforded.

By using a stop close to the light detector, the object scene whose irradiance is back collected is limited. As previously disclosed, this may be achieved with a solid aperture placed in the optical medium during manufacture or by using a dynamic optical stop such as two crossed liquid crystal arrays to block polarized light. Coupled to a variable angle of scanning by varying the amplitude of a micro-mirror oscillation, the reader has a field-of-view that is dynamically adaptable to the conditions of use.

Efficiency may be degraded when using the concentrator at different angles of acceptance. Therefore it is preferable that the design fulfills the edge ray principle at the scanning angle, which is also the angle acceptance, corresponding to conditions where it is desirable to have the best coupling efficiency. This usually corresponds to far field scanning with a narrow scanning angle. Near field scanning using a larger angle of scanning has lower light collection efficiency, which is acceptable because the radiation of the spot is much higher.

FIG. 6 shows the calculated two types of scanning: far field with a 20° scanning angle and near field with a 40° scanning angle. The calculation includes using a vertical semi angle acceptance of approximately 2° to account for some misalignment of the laser beam. With a 15 mm focal length, the width of the detector is either a 2.8 mm×1.5 mm or 5.6 mm×1.5 mm corresponding to either 20° or 40° field of scan. Both surfaces are optimized to fulfill the edge ray principle. The collector efficiency is optimized for long-range reading when the amount of incoming light is minimized. At this distance, the angle of scanning is limited to 20°. The edge ray principle is applied for the corresponding semi angle of acceptance $\theta_s=10°$. This corresponds to a detector using 2.8 mm×1.5 mm mask stop. Without the stop the detector surface is 5.6 mm×1.5 mm and the scanning width analysis rises to 40°. The efficiency of the collector is degraded as the edge ray principle isn't satisfied at the edge of the field, however, this degradation is acceptable considering that the calculated configuration corresponds to near field scanning where there is significant amounts of incoming light.

Figure 7:
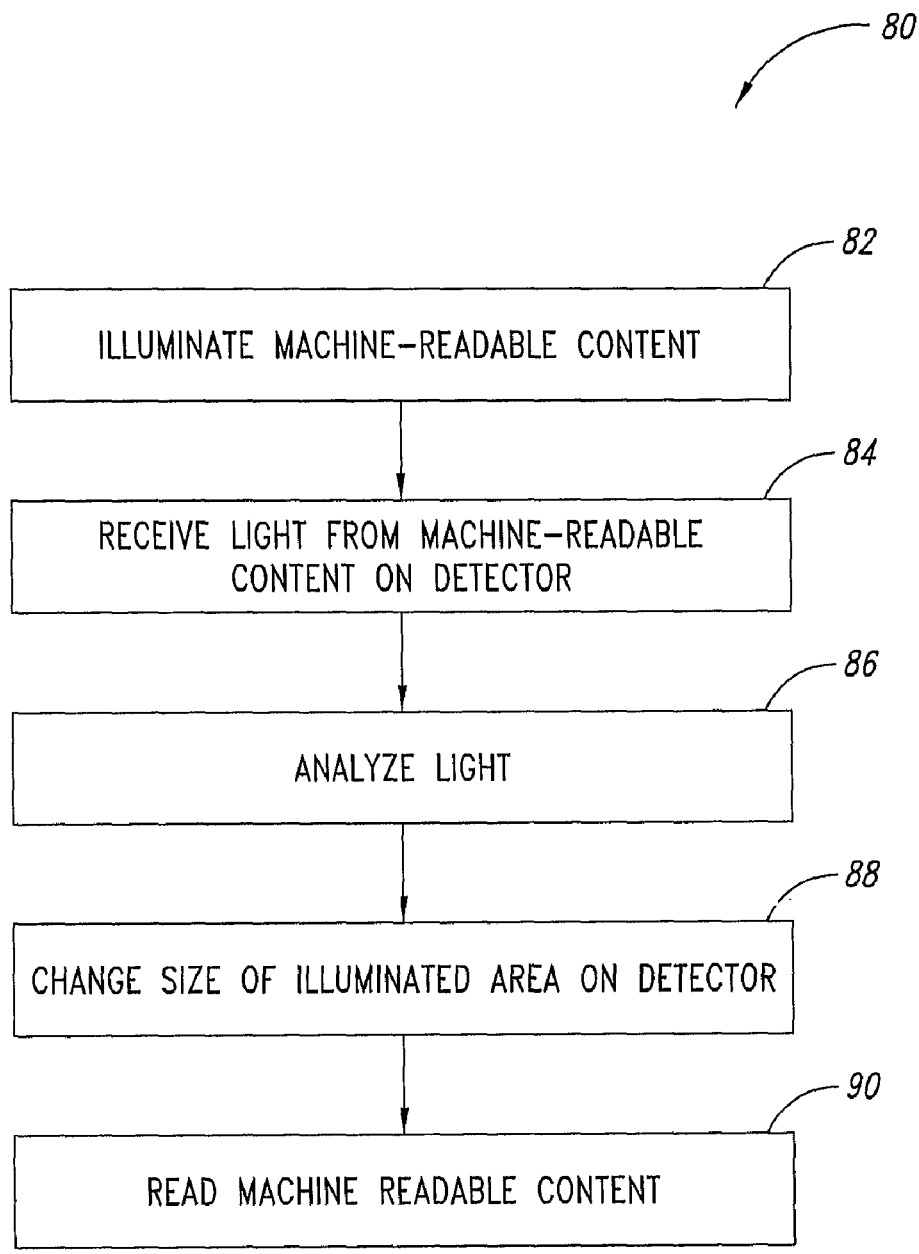
FIG. 7 is a flow diagram showing a method of operating an optoelectronic reader according to one illustrated embodiment.

FIG. 7 illustrates a method of adapting the field-of-view of the optoelectronic reader 10 according to one illustrated embodiment.

At 82, illumination subsystem 24a, 24b illuminates the machine-readable symbol 12. In some embodiments, the active illumination of the machine-readable symbol 12 is optional. In that case, the machine-readable symbol 12 may be illuminated by ambient light.

At 84, the optoelectronic reader 10 receives light returned from the machine-readable symbol 12.

At 86, the received light is analyzed by the control subsystem 20a, 20b. Typically, the optoelectronic reader 10 is configured to scan with a wide scan angle so as to insure that the entire machine-readable symbol 12 is initially scanned. Then, the control subsystem 20a, 20b may determine which pixels in the light detector are receiving light from the edges of the machine-readable symbol 12. For example, if the machine-readable symbol 12 is a symbol such as a bar code symbol that includes "quiet zones" at the edges, then the control subsystem 20a, 20b can determine which pixels in the light detector are receiving light from the edges based upon the intensity of the light received at the pixels. Alternatively, the optoelectronic reader 10 may be configured to initiate scanning with a narrow scan angle and then increase the scan angle until the edges of the machine-readable symbol 12 are covered in a scan. After scanning from edge to edge of the machine-readable symbol 12, the control subsystem 20a, 20b can then determine which pixels in the light detector are receiving light from the edges of the machine-readable symbol 12.

At 88, the control subsystem 20a, 20b changes the effective size of the light detector. The control subsystem 20a, 20b changes the effective size of the light detector such that the field-of-view of the light detector includes at least all of the machine-readable symbol 12. Preferably, the control subsystem 20a, 20b changes the effective size of the light detector such that no light or very little light that is not returned from the machine-readable symbol 12 is received by the light detector.

At 90, the optoelectronic reader 10 reads the machine-readable symbol 12. In some situations, the control subsystem 20a, 20b may control the scan rate, i.e., the length of time that the light illuminating the machine-readable symbol 12 takes to scan from edge-to-edge of the machine-readable symbol 12, while reading the machine-readable symbol 12. The control subsystem 20a, 20b may base the scan rate upon the field-of-view of the detector.

The various embodiments described above can be combined to provide further embodiments. All of the U.S. patents, U.S. patent application publications, U.S. patent applications, foreign patents, foreign patent applications and non-patent publications referred to in this specification, including but not limited to U.S. Provisional Patent Application No. 60/722,466, filed Sep. 30, 2005, and U.S. Pat. No. 6,879,428, filed Dec. 24, 2002, are incorporated herein by reference, in their entirety. Aspects of the invention can be modified, if necessary, to employ systems, circuits and concepts of the various patents, applications and publications to provide yet further embodiments of the invention.

These and other changes can be made in light of the above-detailed description. In general, in the following claims, the terms used should not be construed to limit the claims to the specific embodiments disclosed in the specification and the claims, but should be construed to include all optoelectronic readers in accordance with the claims. Accordingly, the invention is not limited by the disclosure, but instead its scope is to be determined entirely by the following claims.

The invention claimed is:

1. An optoelectronic reader for reading machine-readable symbols, the optoelectronic reader comprising:
   an illumination subsystem configured to illuminate a machine-readable symbol;
   an RX concentrator comprising a first shaped optical medium having a top surface defining an aperture for receiving light from the machine-readable symbol and an optically opposed reflective bottom surface, the reflective bottom surface configured to focus light reflected from the reflective bottom surface at a first focal point between the top surface and the bottom surface of the first shaped optical medium; and
   a first light detector disposed inside of the RX concentrator at the first focal point between the top surface and the bottom surface of the first shaped optical medium.

2. The optoelectronic reader of claim 1 wherein the illumination subsystem comprises a light source and a scanning mechanism.

3. The optoelectronic reader of claim 2 wherein the scanning mechanism comprises an oscillatory mirror.

4. The optoelectronic reader of claim 2 wherein the light source comprises a laser diode.

5. The optoelectronic reader of claim 1 wherein the first light detector is a photodiode.

6. The optoelectronic reader of claim 1, further comprising:
   an optical stop disposed between the first light detector and the bottom surface of the RX concentrator, the optical stop forming an optical stop aperture, the optical stop aperture defining an acceptance angle for incident light.

7. The optoelectronic reader of claim 6, wherein the optical stop is a liquid crystal array.

8. The optoelectronic reader claim 1 wherein the RX concentrator further comprises a second shaped optical medium having a respective top surface defining an aperture for receiving light from the machine-readable symbol and a respective optically opposed reflective bottom surface, the reflective bottom surface configured to focus light reflected therefrom at a second focal point between the respective top surface and the respective bottom surface of the second shaped optical medium, and further comprising:
   a second light detector disposed inside of the RX concentrator at the second focal point between the respective top surface and the respective bottom surface of the second shaped optical medium.

9. The optoelectronic reader claim 8 wherein the first shaped optical medium and the second shaped optical medium are contiguous.

10. The optoelectronic reader of claim 8 wherein the RX concentrator defines an optical path for light emitted from the illumination subsystem, wherein the optical path is between the first and the second light detectors.

11. The optoelectronic reader of claim 10, wherein the optical path is an opening extending from respective portions of the respective bottom surfaces of the first and the second shaped optical media to respective portions of the respective top surfaces of the first and the second shaped optical media.

12. The optical reader of claim 1, wherein the RX concentrator defines an optical path for light emitted from the illumination subsystem.

13. The optical reader of claim 12, wherein the optical path is an opening extending from the bottom surface of the first shaped optical medium to the top surface of the first shaped optical medium.

14. A method of using an optoelectronic reader for reading machine-readable symbols, the method comprising:
   receiving light returned from machine-readable symbols at a concentrator aperture of an RX concentrator, the RX concentrator being a optical medium having the concentrator aperture as a top surface and an optically opposed reflective bottom surface;
   reflecting light received at the concentrator aperture from a first portion of the reflective bottom surface of the RX concentrator;
   receiving light focused by and reflected from the first portion of the bottom surface of the RX concentrator at an illumination area of a surface of a detector disposed between concentrator aperture and the bottom surface of the optical medium RX concentrator;
   analyzing the light received at the detector;
   changing the illumination area from a first size to a second size based at least on the analysis of the light received at the detector; and
   reading the machine-readable symbols using light incident upon the illumination area having the second size.

15. The method of claim 14 wherein changing the illumination area from a first size to a second size includes adjusting an optical stop disposed in the optical medium between the bottom surface of the optical medium and the detector such that the second size is less than the first size.

16. The method of claim 14 wherein changing the illumination area from a first size to a second size includes adjusting an optical stop disposed in the optical medium between the bottom surface of the optical medium and the detector such that the second size is greater than the first size.

17. The method of claim 14, wherein analyzing the received light includes detecting a first quiet zone in the light reflected onto the second sized illumination area.

18. The method of claim 14, wherein analyzing the received light includes detecting at least one edge of the machine-readable symbols.

* * * * *